United States Patent
Hodebourg et al.

(10) Patent No.: US 9,567,948 B2
(45) Date of Patent: Feb. 14, 2017

(54) ENGINE CONTROL VALVE WITH FLAP AND FLAT SEAL

(71) Applicant: Valeo Systemes de Controle Moteur, Cergy Saint Christophe (FR)

(72) Inventors: Grégory Hodebourg, Sartrouville (FR); Stéphane Soubrier, Montreuil (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 0 days.

(21) Appl. No.: 14/431,670

(22) PCT Filed: Sep. 26, 2013

(86) PCT No.: PCT/FR2013/052284
§ 371 (c)(1),
(2) Date: Mar. 26, 2015

(87) PCT Pub. No.: WO2014/049286
PCT Pub. Date: Apr. 3, 2014

(65) Prior Publication Data
US 2015/0240754 A1    Aug. 27, 2015

(30) Foreign Application Priority Data
Sep. 28, 2012 (FR) ..................... 12 59179

(51) Int. Cl.
*F16K 1/226* (2006.01)
*F16K 1/20* (2006.01)
(Continued)

(52) U.S. Cl.
CPC ............ *F02M 26/70* (2016.02); *F16K 1/2057* (2013.01); *F16K 1/2263* (2013.01); *F16K 11/0525* (2013.01); *F16K 27/0218* (2013.01)

(58) Field of Classification Search
CPC F16K 27/0218; F16K 11/0525; F16K 1/2057; F16K 1/226; F16K 1/2263; Y02T 10/121; F02M 26/70
(Continued)

(56) References Cited

U.S. PATENT DOCUMENTS 3,238,955 A * 3/1966 Lassiter, Jr. ............ B64D 13/02
251/305
4,333,441 A * 6/1982 Still ..................... F02M 23/001
123/590
(Continued)

FOREIGN PATENT DOCUMENTS

FR 2 933 469 A1 1/2010
FR 2 962 184 A1 1/2012

OTHER PUBLICATIONS

International Search Report issued in PCT/FR2013/052284 mailed on Jan. 24, 2014 (4 pages).

*Primary Examiner* — John Bastianelli
(74) *Attorney, Agent, or Firm* — Osha Liang LLP

(57) ABSTRACT

In an engine control valve having a body delimiting an internal duct and including a flap mounted such that it can pivot via a spindle of the flap, the flap includes a first part and is able to pivot between an open position that allows gases to pass along the duct, and a closed position in which the flap comes into contact with a flat seal inserted between two elements of the valve body, the seal has an exterior contour that externally surrounds the exterior contour of the flap, the seal includes an opening and a solid portion, the first part closes off the opening of the seal when the flap is in a closed position, and the seal includes at least one slit formed in the peripheral zone of the solid portion, the at least one slit communicating with the opening.

13 Claims, 2 Drawing Sheets

(51) Int. Cl.
*F16K 11/052* (2006.01)
*F16K 27/02* (2006.01)

(58) Field of Classification Search
USPC .......................... 251/305–308, 298; 123/337
See application file for complete search history.

(56) References Cited

U.S. PATENT DOCUMENTS

| | | | | |
|---|---|---|---|---|
| 4,420,140 | A * | 12/1983 | Gachot | F16K 1/22 |
| | | | | 251/308 |
| 4,463,742 | A * | 8/1984 | Williams | F02M 29/04 |
| | | | | 123/179.7 |
| 5,480,123 | A * | 1/1996 | Bey | F16K 47/08 |
| | | | | 251/305 |
| 5,924,398 | A * | 7/1999 | Choi | F02D 9/104 |
| | | | | 123/184.21 |
| 6,367,772 | B1 * | 4/2002 | Glogovcsan, Jr. | F02D 9/02 |
| | | | | 251/305 |
| 6,662,772 | B1 * | 12/2003 | Murphy | F02B 31/06 |
| | | | | 123/184.21 |
| 6,763,802 | B1 * | 7/2004 | Brassell | F02B 23/08 |
| | | | | 251/305 |
| 7,264,221 | B2 * | 9/2007 | Yeary | F16K 1/22 |
| | | | | 251/308 |
| 2011/0155110 | A1 * | 6/2011 | Festor | F16K 1/2263 |
| | | | | 123/568.11 |
| 2013/0146038 | A1 * | 6/2013 | Adenot | F02M 25/0793 |
| | | | | 123/568.11 |

* cited by examiner

ENGINE CONTROL VALVE WITH FLAP AND FLAT SEAL

The invention relates to an engine control valve with improved sealing. This type of valve may be provided, for example, on a gas supply circuit for an internal combustion engine of a vehicle, to regulate the flow of EGR (Exhaust Gas Recirculation) gases in a loop permitting a portion of the exhaust gases discharged from the engine to be drawn off in order to re-inject the gases upstream of said engine. The operating principle of this type of valve is based on the controlled rotation of a flap which is able to pass from a fully open position to permit the fluid to pass, into a closed position to block this passage of fluid. The subject of the invention is an engine control valve with improved sealing.

An engine control valve thus comprises a flap which is pivotably mounted on a pivot pin. The flap may comprise a first part and a second part separated by the pivot pin. When this flap is located in a closed position it comes into contact with a seal fixed to the body of the valve, said seal ensuring the seal of the valve by acting as a positioning stop of said flap. More specifically, the seal is generally flat and is fixed in the body of the valve by being inserted in the region of its periphery between two cast elements of said body. The seal has an opening and when the flap is in the closed position, the first part of the flap comes into contact with one of the two faces of the seal to seal said opening, while the second part of said flap is flush with the other face of said seal. The flap is of small thickness and generally has a substantially rectangular shape.

Firstly, for reasons associated with the manufacture thereof, the seal only covers three of the four peripheral edges of said flap, leaving a potential passage free for gases in the region of the fourth edge of the flap which is not covered by said seal. Thus, when the flap is in the closed position against the seal, said passage is capable of facilitating an unexpected leakage of the gases. This results in an inadequate seal of said valve in the closed configuration.

Secondly, one solution to remedy this poor quality seal has consisted in manufacturing a seal either in a single part or in two parts and which is sufficiently extended to cover fully the four peripheral edges of the flap and thus limit the sources of the leakage.

More specifically, with reference to FIG. 1, a problem regularly encountered with this type of extended seal 1 is that it is subjected both to high pressure and high temperatures from the gases present in the valve and the seal thus tends to be deformed as a result of thermal dilation. Since it is inserted in the region of its external edge 2 between two cast elements, the deformation essentially relates to the central part 3 of the seal 1, with the creation of hollow portions 4 and/or projections, capable of forming leakage passages for the gases located in the valve. More specifically, the central part of the seal comprises a solid portion 3 and an opening 6, the deformation being produced in the region of said solid portion 3. Moreover, in the case where the seal 1 is deformed, creating hollow portions 4, there is the risk of an artificial stop being created blocking the flap and thus hampering the pivoting thereof for it to come into contact with said seal 1 in order to ensure the closure of the valve. In other words, the deformation of the seal 1 risks impairing the operating mechanism of the valve and creating leakage passages for the gases passing through said valve.

The application FR 2 933 469 discloses a valve comprising a seal cooperating with a flap pivoting in a duct. The seal comprises slots which are arranged in the duct.

The subject of the invention according to one of its features is an engine control valve having a body delimiting an internal duct and comprising a flap pivotably mounted by a pin of the flap, the flap comprising a first part and being capable of pivoting between an open position permitting the passage of gas into the duct and a closed position in which the flap comes into contact with a seal, in particular a flat seal, inserted between two elements of the body of the valve, said seal having an external contour externally surrounding the external contour of the flap, the seal comprising an opening and a solid portion, said first part sealing the opening of the seal when the flap is in a closed position, the seal comprising at least one slot formed in the peripheral zone of the solid portion and communicating with the opening.

As the slot is formed in the peripheral zone of the solid portion of the seal, it may also be called a "lateral slot".

The slot may comprise a portion arranged outside the internal duct. This portion is arranged, for example, between the two elements of the body of the valve which are, for example, two cast elements. Said portion of the slot is thus not located in the gaseous flow circulating in the internal duct of the valve on both sides of the flap, when said flap is not in the closed position.

An engine control valve disclosed above uses an extended seal entirely covering the flap and configured so as to avoid a deformation of its central part by thermal dilation, as a result of the presence of hot gases under pressure in said valve. In this manner, this engine control valve will operate correctly whatever the temperature and the pressure of the gases circulating via said valve, without the risk of its flap being blocked in rotation as a result of the deformation of the seal. Moreover, since the seal retains good surface flatness, its interaction with the flap will be optimized to ensure a good seal of the valve in the closed configuration.

Each slot constitutes an expansion space which permits the seal to dilate as a result of the hot gases present in the valve, occupying at least partially said space. Each slot therefore orientates the direction of expansion of the seal, preventing the deformation from occurring on its central part. The seal may remain flat during all of the phases of use of the valve without causing leakage passages for the gases and without the risk of blocking the rotation of the flap. Preferably, each slot is produced by laser cutting. Preferably, the seal is strictly flat over its entire surface, being without a peripheral lip. Advantageously, each slot is rectilinear and of constant width, extending parallel to the peripheral edge externally delimiting the solid portion.

Advantageously, the seal comprises two parallel slots, each extending into a peripheral zone of the solid portion and each communicating with the opening. Each of these slots may be parallel to the peripheral edge externally delimiting said peripheral zone of the solid portion.

The expansion space provided to permit the thermal dilation of the seal is doubled by the presence of said two slots. In this manner, the seal is able to dilate in two places, embodied by the two slots, reducing the risk of its central part deforming.

Preferably, each slot communicates with an end of the opening, viewed along an axis separating said opening and said solid portion, each slot extending perpendicular to said axis of separation. In other words, the two slots extend into the solid portion of the seal, in a direction perpendicular to the axis which constitutes the separation between the opening and the solid portion. In this manner, the total opening of the seal has a compact and rectangular part, extended by two tapered slots.

Advantageously, each slot has a width ranging between 0.2 mm and 0.8 mm. These width values permit the slots to absorb efficiently the dilation of the seal, while not creating potential leakages for the gases present in the valve.

Preferably, each slot has a width of 0.5 mm.

Advantageously, the seal is inserted between two connecting seals covering each of the slots, each of said connecting seals being in contact with an element, in particular a cast element, of the body. Said two connecting seals contribute to ensuring a good seal between the seal and the two elements of the body, sealing the two slots of the seal. More specifically, as the risk of leakage in the region of the slots inserted between the two elements of the body is not negligible, it is desirable to add two connecting seals to isolate said slots effectively and thus eliminate this risk.

Preferably, each connecting seal is provided with a peripheral lip. In this manner, when the seal is mounted between the elements of the body, said connecting seals are able to absorb the clamping forces between said elements of the body by deforming in the region of their peripheral lip, and contribute to preserving the structural integrity of the seal. In other words, the shape and the position of the seal do not fluctuate when clamped between the two elements of the body. As a result, the definitive position of the seal once fixed between the elements of the body will strictly correspond to its ideal pre-positioning in the valve before its mounting. Such a control of the mounting of the seal in the valve permits its interaction with the flap to be optimized in order to ensure good sealing conditions when said valve is in its closed position.

Advantageously, each connecting seal has an opening, the dimensions thereof being greater than those of the opening of the seal. More specifically, since only the peripheral zone of each connecting seal fulfils a specific function, it is desirable to design said seals to be lightweight, space-efficient and easy to manufacture. Annular connecting seals are perfectly capable of fulfilling this function while respecting the requirements cited above.

The flap may comprise a second part separated from the first part by the pin of the flap, said second part being flush with the solid portion of the seal when the flap is in a closed position. The solid portion of the seal may thus be arranged outside the gaseous flow passing through the internal duct.

Preferably, the flap thus comprises a rounded bulged portion placed between the second part and the pivot pin, said bulged portion being positioned so as to remain in contact with the solid portion of the seal when the flap pivots between an open position and a closed position or vice versa. More specifically, since the seal is inserted in the region of its peripheral zone between two elements of the body of the valve, its central part therefore constitutes a structural weakened zone, capable of deforming as a result of the raised temperature and pressure of the gases which circulate in said valve, resulting in the creation of leakage passages for said gases and the possible blockage in rotation of said flap. In spite of the presence of the slots which constitute expansion spaces for the seal to dilate thermally, the bulged portion complements the action of said slots by permanently supporting said solid portion, remaining in contact during the complete pivoting of the flap when passing from a closed position into an open position or vice versa. This bulged portion thus acts as a second level of security, in order to contribute to maintaining the seal in a state of perfect flatness when the seal is strictly flat over its entire surface. Such a bulged portion, as a complement to said slots, ensures correct operation of the valve in addition to a good seal thereof, avoiding a deformation of the solid portion of the seal.

Advantageously, the bulged portion extends parallel to the pivot pin. More specifically, the bulged portion has to be designed to maintain as a priority the solid portion of the seal in a direction parallel to the pivot pin of the flap, as the seal is most liable to deform in this direction. This bulged portion may either be in one piece or consist of at least two separate parts aligned in a direction parallel to the pivot pin.

A further subject of the invention according to another of these features is a seal for the use of a valve according to the invention.

A valve according to the invention has the advantage of being efficient in terms of operation, preventing in a simple and clever manner the deformation of the seal, without in particular having to resort to redesigning fundamentally the body of said valve. Said valve also has the advantage of retaining a consistent space requirement relative to valves which already exist, since the slot(s) formed in the seal result from a removal of material. A valve according to the invention finally has the advantage of not involving further cost, while having additional functionality implemented by the existence of the slots.

A detailed description is provided hereinafter of a preferred but non-limiting embodiment of a valve according to the invention, with reference to the accompanying drawings, in which.

An engine control valve according to the invention may be, for example, an EGR (Exhaust Gas Recirculation) valve regulating the flow of gases in a loop connecting an exhaust circuit to an air intake circuit of an internal combustion engine of a vehicle.

Figure 1:
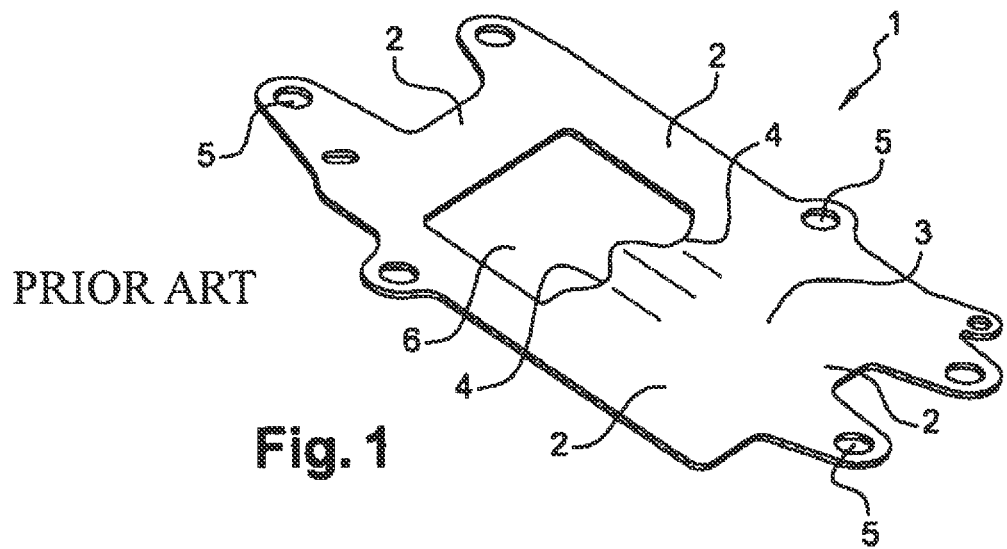
FIG. 1 is a wireframe view of a deformed seal of the prior art.

With reference to FIG. 1, a seal 1 of the prior art is made of rigid stainless steel and is inserted in the region of its peripheral zone 2 between two cast elements made of stainless steel of the body of said valve 1. This peripheral zone 2 thus comprises a specific number of orifices 5 designed to be passed through by screws to fix the seal 1 between said cast elements. Said seal 1 is flat, of substantially rectangular shape and of small thickness, and has a solid portion 3 in addition to a through-opening 6 for the gases, said portion 3 and said opening 6 constituting the central part of said seal 1. The opening 6 is rectangular and has been formed in the seal 1 such that its longitudinal axis is perpendicular to the longitudinal axis of the rectangular seal 1.

Figure 2:
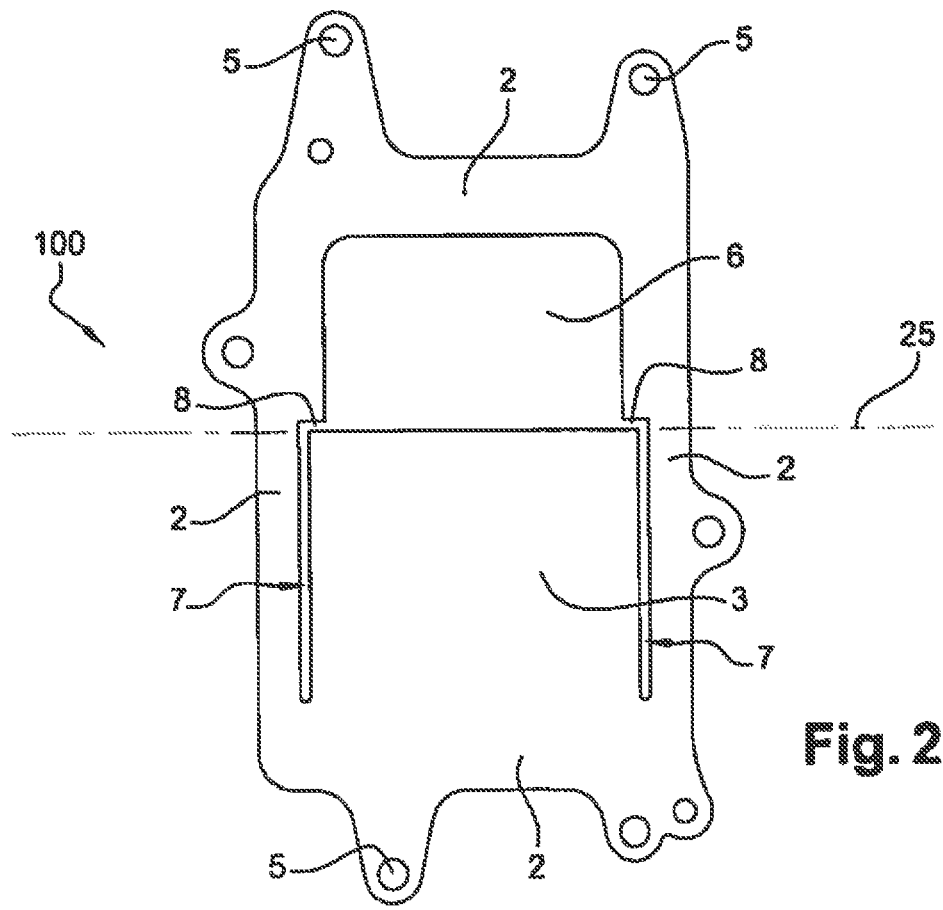
FIG. 2 is a wireframe view of a seal of a valve according to the invention.

With reference to FIG. 2, a seal 100 of a valve according to the invention differs from a seal 1 of a valve according to the prior art in that the opening 6 communicates with two lateral, rectilinear and parallel slots 7 extending in the peripheral zone 2 surrounding the solid portion 3. More specifically, each slot 7 is connected via a segment 8 of small length with an end of the opening 6 viewed relative to a longitudinal axis of said opening 6 and which progresses to the external edge of the seal 100 parallel to said longitudinal axis 25. This longitudinal axis 25 is the axis which separates the opening 6 and the solid portion 3 of the seal 100. Each first segment 8 opens into a rectilinear and perpendicular slot 7 which extends along a longitudinal axis of the seal 100 in a longitudinal peripheral zone 2 of said seal 100 surrounding the solid portion 3. The distance separating each slot 7 is greater than the length of a long side of the rectangular opening 6. Each slot 7 and the first segment 8 are produced, for example, by laser cutting the seal 100 made of stainless steel, having a uniform width of 0.5 mm.

Figure 3:
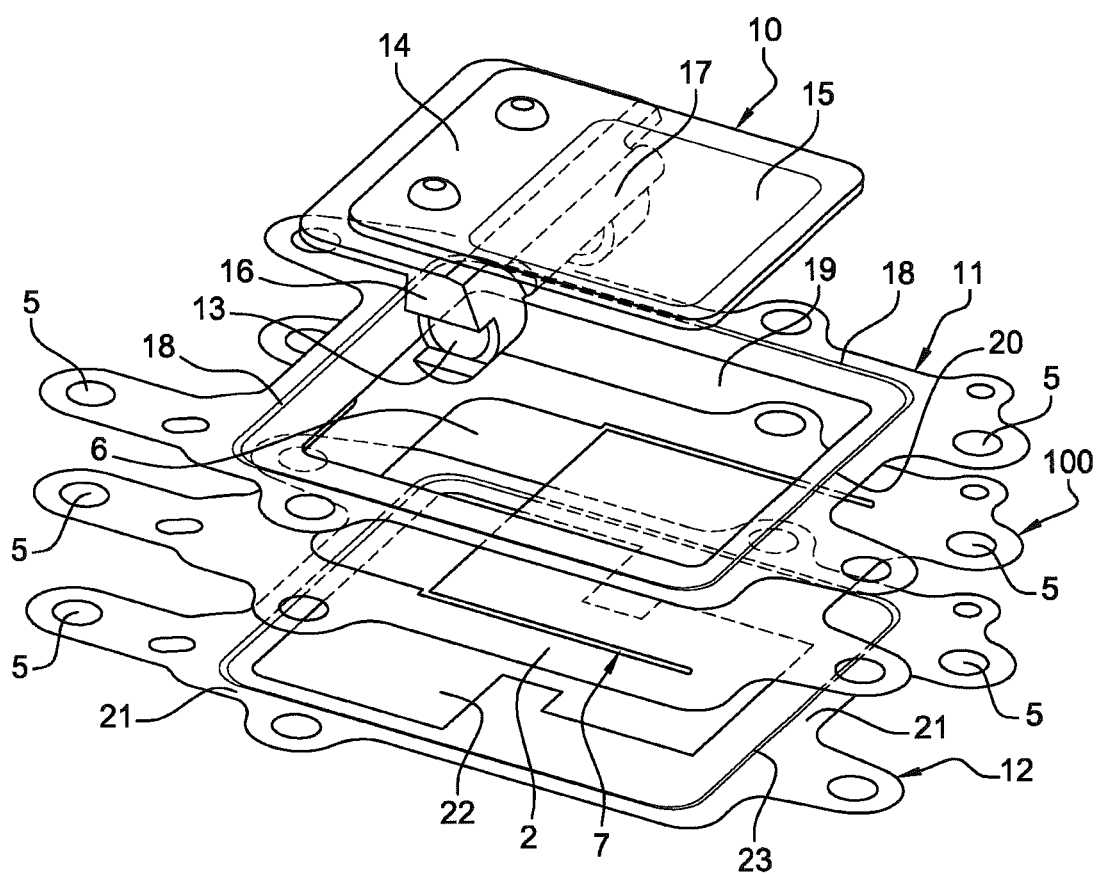
FIG. 3 is an exploded view of an assembly consisting of three superposed seals and a flap, and used in a valve according to the invention.

With reference to FIG. 3, an engine control valve according to the invention uses a flap 10 and three seals 11, 12, 100 designed to be inserted between two elements of the body of said valve. The flap 10 comprises a pivot pin 13 in addition to a first part 14 and a second part 15, said parts 14, 15 being placed on both sides of said pin 13, in the continuation of one another. Said two parts 14, 15 are of small thickness and are fixed rigidly together. The overall contour of the flap 10 delimited by said two parts 14, 15 is substantially rectangular, each of said parts 14, 15 also being of rectangular shape. The pivot pin 13 is offset relative to a plane including the two parts 14, and is located at the end of a lever arm 16 extending substantially perpendicular to said plane, said arm 16 originating in the region of the imaginary interface plane between said parts 14, 15. The term "imaginary" means that no particular mark indicates precisely the location of the interface plane on the flap 10 between the two parts 14, 15. The flap 10 comprises a rounded bulged portion 17 placed on the lever arm 16, between the second part 15 and the pivot pin 13, said bulged portion 17 extending parallel to said pin 13. The bulged portion 17 protrudes from the lever arm 16 parallel to the second part 15 and has a cross section delimited by a rectilinear segment and a curved segment, the two ends thereof joining the two ends of said rectilinear segment. The rectilinear segment corresponds to a flat and rectangular base of the bulged portion 17 by which it is fixed to the lever arm 16 and the curved segment corresponds to the rounded external surface of said bulged portion 17. The length of said bulged portion 17 ranges between 50% and 75% of the total length of the pivot pin 13.

A valve according to the invention also comprises three seals 11, 12, 100, one thereof representing the seal 100 capable of cooperating with the flap 10 to ensure the seal of the valve when said valve is in a closed position, the two other seals 11, 12 constituting the connecting seals for fixing the seal 100 in the valve. The seal 100 is shaped according to that illustrated in FIG. 2 and, therefore, has the particularity of being provided with two parallel slots 7, designed to form the extension spaces for the seal 100 which is liable to be subjected to thermal dilation as a result of the presence of hot gases in the valve. One 11 of the two connecting seals is annular and essentially consists of a peripheral zone 18 delimiting a widened opening 19 relative to that 6 of the connecting seal 100. This annular peripheral zone 18 is provided with a peripheral lip 20.

The peripheral zone 18 of this connecting seal 11 has the same geometry and the same dimensions as those of the peripheral zone 2 of the seal 100. The other connecting seal 12 is generally annular and consists of a peripheral zone 21 delimiting a profiled opening 22, the dimensions thereof being greater than those of the opening 6 of the seal 100. The peripheral zone 21 of this other connecting seal 12 is provided with a peripheral lip 23 and the same geometry and the same dimensions as those of the peripheral zone 2 of the seal 100. The peripheral zones 2, 18, 21 of the three seals 11, 12, 100 are provided with orifices 5 placed in the same location, so that when said three seals 11, 12, 100 are superposed in an ideal manner, their peripheral zones 2, 18, 21 and their orifices 5 correspond perfectly. These orifices 5 are designed to be passed through by screws to ensure the fixing of three seals 11, 12, 100 between the two elements of the body of the valve.

These three seals 11, 12, 100 are placed between the two elements of the body in the region of their peripheral zone 8, 18, 21 by being superposed in an ideal manner, the seal 100 being placed between the two connecting seals 11, 12 and each of said connecting seals 11, 12 being in contact with a different element of the body. In this superposed configuration, the two slots 7 of the seal 100 are placed between the peripheral zones 18, 21 of the two connecting seals 11, 12. In this manner, said peripheral zones 18, 21 sealingly isolate said slots 7 from the duct for the passage of gases into the valve, such that they are not able to form leakage passages for said gases.

The flap 10 is mobile in rotation between an open position in which it allows the gases to pass into the duct passing through the valve and a closed position in which the first part 14 of the flap comes into contact with a face of the seal 100 to seal the opening 6, and the second part 15 of the flap 10 is flush with the opposing face of said seal 100 in the region of the solid portion 3. The flap 10 is controlled in rotation between said two extreme positions and may occupy a plurality of intermediate positions between said extreme positions.

The two connecting seals 11, 12 ensure a first function when the seal 100 is mounted in the valve, by absorbing the clamping forces between the two elements of the body, preventing the seal 100 from deforming. More specifically, said connecting seals 11, 12 are deformed in the region of their peripheral lip 20, 23 during this clamping, thus preserving the structural integrity of the seal 100.

Said connecting seals 11, 12 also have a second function which is that of ensuring an effective seal of the valve, isolating the two slots 7 of the seal 100 so that they do not constitute leakage passages for the gases.

In the case where a valve according to the invention controls the flow of hot gases under pressure, the seal 100 is able to be dilated thermally in the region of the two free spaces formed by the two slots 7 without being subjected to any major stress. In this manner, the two slots 7 contribute to limiting, even eliminating, any deformation of the solid portion 3 of said seal 100, which could constitute a source of leakages for the gases and/or a source of the blocking in rotation of the flap 10. The rounded protuberance 17 placed on the lever arm 16 of the flap 10 complements the action of the slots 7 by preventing the deformation of the solid portion 3 of the seal 100 during the different rotations of the flap 10, in order to pass from an open position into a closed position or vice versa.

The invention claimed is:

1. An engine control valve, comprising:
   a body delimiting an internal duct and comprising a flap pivotably mounted by a pin of the flap, the flap comprising a first part and being capable of pivoting between an open position permitting the passage of gas into the duct, and a closed position in which the flap comes into contact with a flat seal, inserted between two elements of the body of the valve,
   said seal comprising:
      an external contour externally surrounding the external contour of the flap, the seal comprising an opening and a solid portion, said first part sealing the opening of the seal when the flap is in a closed position; and at least one slot formed in a peripheral zone of the solid portion and communicating with the opening, said slot comprising a portion arranged outside the internal duct, the seal being inserted between two connecting seals covering each of the slots and each of said connecting seals being in contact with an element of the body.

2. The valve as claimed in claim 1, the slot extending along a peripheral edge externally delimiting the peripheral zone of the solid portion.

3. The valve as claimed in claim 1, comprising two parallel slots each extending into a peripheral zone of the solid portion and each communicating with the opening.

4. The valve as claimed in claim 2, each slot communicating with an end of the opening, viewed along an axis separating said opening and said solid portion, each slot extending perpendicular to said axis of separation.

5. The valve as claimed in claim 1, each slot having a width ranging between 0.2 mm and 0.8 mm.

6. The valve as claimed in claim 4, each slot having a width of 0.5 mm.

7. The valve as claimed in claim 1, the seal being strictly flat over its entire surface.

8. The valve as claimed in claim 1, each connecting seal being provided with a peripheral lip.

9. The valve as claimed in claim 1, each connecting seal having an opening, the dimensions thereof being greater than those of the opening of the seal.

10. The valve as claimed in claim 1, the flap comprising a second part separated from the first part by the pin of the flap, said second part being flush with the solid portion when the flap is in a closed position.

11. The valve as claimed in claim 10, the flap comprising a rounded bulged portion placed between the second part and the pivot pin, said bulged portion being positioned so as to remain in contact with the solid portion of the seal when the flap pivots between an open position and a closed position or vice versa.

12. An engine control valve, comprising:
a body delimiting an internal duct and comprising a flap pivotably mounted by a pin of the flap, the flap comprising a first part and being capable of pivoting between an open position permitting the passage of gas into the duct, and a closed position in which the flap comes into contact with a flat seal, inserted between two elements of the body of the valve, said seal comprising:
an external contour externally surrounding the external contour of the flap, the seal comprising an opening and a solid portion, said first part sealing the opening of the seal when the flap is in a closed position;
at least one slot formed in a peripheral zone of the solid portion and communicating with the opening, said slot comprising a portion arranged outside the internal duct; and
a longitudinal axis that separates the opening and the solid portion of the seal.

13. An engine control valve, comprising:
a body delimiting an internal duct and comprising a flap pivotably mounted by a pin of the flap, the flap comprising a first part and being capable of pivoting between an open position permitting the passage of gas into the duct, and a closed position in which the flap comes into contact with a flat seal, inserted between two elements of the body of the valve, the flap further comprising:
a second part separated from the first part by the pin of the flap, the second part being flush with the solid portion when the flap is in a closed position; and
a rounded bulged portion placed between the second part and the pivot pin, said bulged portion being positioned so as to remain in contact with the solid portion of the seal when the flap pivots between an open position and a closed position or vice versa, said seal comprising:
an external contour externally surrounding the external contour of the flap, the seal comprising an opening and a solid portion, said first part sealing the opening of the seal when the flap is in a closed position; and
at least one slot formed in a peripheral zone of the solid portion and communicating with the opening, said slot comprising a portion arranged outside the internal duct.

* * * * *